United States Patent
Zettner et al.

(10) Patent No.: US 11,404,730 B2
(45) Date of Patent: Aug. 2, 2022

(54) SENSOR DEVICE AND METHOD FOR THE OPERATION THEREOF

(71) Applicant: Siemens Aktiengesellschaft, Munich (DE)

(72) Inventors: Jürgen Zettner, Veitsbronn (DE); Dirk Scheibner, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 8 days.

(21) Appl. No.: 16/970,885

(22) PCT Filed: Jan. 24, 2019

(86) PCT No.: PCT/EP2019/051731
§ 371 (c)(1),
(2) Date: Aug. 18, 2020

(87) PCT Pub. No.: WO2019/162034
PCT Pub. Date: Aug. 29, 2019

(65) Prior Publication Data
US 2020/0395639 A1   Dec. 17, 2020

(30) Foreign Application Priority Data
Feb. 21, 2018 (EP) .................... 18157750

(51) Int. Cl.
*H01M 10/48* (2006.01)
*H01M 10/42* (2006.01)
(Continued)

(52) U.S. Cl.
CPC .......... *H01M 10/48* (2013.01); *H01M 10/425* (2013.01); *H01M 10/44* (2013.01); *H02J 7/0047* (2013.01)

(58) Field of Classification Search
None
See application file for complete search history.

(56) References Cited

U.S. PATENT DOCUMENTS

| | | | |
|---|---|---|---|
| 5,907,491 A | 5/1999 | Canada et al. | |
| 2005/0062455 A1* | 3/2005 | Stavely | H02J 7/00047 320/106 |

(Continued)

FOREIGN PATENT DOCUMENTS

| | | |
|---|---|---|
| EP | 2830145 A1 | 1/2015 |
| EP | 2917958 A2 | 9/2015 |

OTHER PUBLICATIONS

PCT International Examination Report and Written Opinion of International Examination Authority dated Mar. 11, 2019 corresponding to PCT International Application No. PCT/EP2019/051731 filed Jan. 24, 2019.

*Primary Examiner* — Roy Y Yi
(74) *Attorney, Agent, or Firm* — Henry M. Feiereisen LLC

(57) ABSTRACT

A sensor device includes a supply battery for supplying energy to the sensor device, a sensor unit for detecting an operating-state data of the supply battery, and a communication unit for transmitting the operating-state data can be transmitted to an evaluation system. The operating-state data of the supply battery can be detected by the sensor unit at different measurement times and are transmitted to the evaluation system which determines the energy demand of the sensor device. An action recommendation for the optimized operation of the sensor device is generated on the basis of the operating-state data and the energy demand.

17 Claims, 4 Drawing Sheets

(51) Int. Cl.
*H01M 10/44* (2006.01)
*H02J 7/00* (2006.01)

(56) References Cited

U.S. PATENT DOCUMENTS

2010/0271199 A1* 10/2010 Belov ................. G01M 5/0008
340/539.3
2013/0317659 A1 11/2013 Thomas et al.
2014/0089692 A1 3/2014 Hanafusa
2014/0129162 A1 5/2014 Hallman et al.

* cited by examiner

SENSOR DEVICE AND METHOD FOR THE OPERATION THEREOF

CROSS-REFERENCES TO RELATED APPLICATIONS

This application is the U.S. National Stage of International Application No. PCT/EP2019/051731, filed Jan. 24, 2019, which designated the United States and has been published as International Publication No. WO 2019/162034 A1 and which claims the priority of European Patent Application, Serial No. 18157750.3, filed Feb. 21, 2018, pursuant to 35 U.S.C. 119(a)-(d).

BACKGROUND OF THE INVENTION

The invention relates to a battery-operated sensor device and to a method for operating such a sensor device.

In particular, the invention relates to a sensor device for monitoring a drive system, in particular for monitoring an electric machine, and to a method for operating a sensor device of this type. Sensor devices which are referred to as smart sensor boxes or condition monitoring boxes (CM boxes) and record measuring data, for instance vibrations or temperatures, are frequently used in particular to monitor electric machines. In order to avoid or reduce wiring effort, sensor devices of this type frequently have batteries for their power supply and wireless communication devices, in particular for the wireless transmission of the detected measuring data, for instance communication devices for communication by means of radio signals according to a Bluetooth or WLAN standard (WLAN=Wireless Local Area Network).

A battery is understood here to mean a storage unit for electrical energy on an electrochemical basis, which can be embodied to be rechargeable or not rechargeable. In particular, rechargeable batteries count among the batteries here. A battery for a sensor device is designed as a function of an energy demand of the sensor device to be expected and of an assumed temperature profile of the sensor device, in particular with respect to its capacitance and its discharge currents. In the case of a rechargeable battery, aside from the discharge current, many other influencing variables influence the storage capacity of the rechargeable battery, for instance the temperature, aging effects, the recovery effect, the increasing losses of an internal resistance of the rechargeable battery and the limited speed of the electrochemical processes and charge transport processes in the rechargeable battery. In order to design a rechargeable battery optimally for a sensor device, these influencing variables are therefore also to be taken into account.

However, many of these variables which are relevant to the design of a battery can only be estimated in advance with difficulty or with significant uncertainty. For instance, the energy demand of a sensor device comprises both the energy demand for the detection and processing of measuring data and also the energy demand for the (radio) communication. When the energy demand is estimated, it should also be taken into account that a sensor device is generally operated in a hybrid operation with various operating modes, which differ from one another in respect of their respective energy demand. The operating times to be allotted to the individual operating modes during real operation of the sensor device and thus the energy demand which arises overall in each case for an operating mode can only be estimated with difficulty in advance, since, for instance, in critical operating states of a drive system monitored with the sensor device, measuring data is demanded in short time intervals in order to monitor the state of the drive system in a rapid and reliable manner.

Furthermore, both the energy demand of a sensor device and also the capacitance and ageing effects of a battery are very temperature-dependent. A prediction of a temperature curve of the temperature of a sensor device is likewise afflicted with great uncertainty, however.

It is therefore extremely difficult and practically impossible, in advance, to reliably determine a battery which is optimally adjusted to the real operation of the sensor device for a battery-operated sensor device. During operation of the sensor device a battery installed in a sensor device therefore proves generally either to be underdimensioned or to be overdimensioned. In the case of an underdimensioned battery, the functional efficiency of the sensor device is negatively affected, in particular failure of the sensor device is possible before an operating duration provided for the sensor device has elapsed. In the case of an overdimensioned battery, the sensor device is generally not embodied cost-effectively since an excessively complex and therefore expensive battery is used.

The patent application US 2013/317659 A1 describes a distributed wireless monitoring system with low-power remote sensors, which contains a data encoding/compression on the sensors, in order to reduce the power consumption by means of transmission and storage. Furthermore, the monitoring system contains an event-controlled operation/data logging, a remote configuration of event-triggering threshold values and correlation templates, distributed processing possibilities and a sensor-clock synchronization by way of a network time service.

The patent application EP 2 830 145 A1 describes a method for monitoring battery storage units which contains the following: receiving identification information, which identifies a battery storage system, and characteristic data, which indicates a state of at least one battery storage unit; determining an ageing model, which corresponds to the at least one battery storage unit, based on the received characteristic data, from the age models managed in a database which indicate the ageing tendencies of further battery storage units; generating control data relating to the communication network in order to improve an ageing state of the at least one battery storage unit at a predetermined time instant according to the corresponding age model; transmitting the generated control data to the battery storage system; and controlling the at least one battery storage unit in the battery storage system on the basis of the transmitted control data.

The object underlying the invention is to specify an improved battery-operated sensor device, particularly in respect of its design and its operation.

SUMMARY OF THE INVENTION

The object is achieved according to the invention by a method as set forth hereinafter, and by a sensor device as set forth hereinafter.

Advantageous embodiments of the invention form the subject matter of the dependent claims.

The Inventive method relates to the operation of a sensor device, which has a supply battery for supplying power to the sensor device, a sensor unit, with which operating state data of the supply battery can be detected, and a communication unit, with which the operating state data can be transmitted to an evaluation system. With the method operating state data is detected with the sensor unit at different measuring time points, with the communication unit the operating state data is transmitted to the evaluation system and the evaluation system is used to determine an energy demand of the sensor device and to generate a recommendation for action for the optimized operation of the sensor device on the basis of the operating state data and the energy demand. In the evaluation system battery type data of various battery types is provided, wherein a preferential battery type is determined by the evaluation system on the basis of the battery state data, the energy demand and the battery type data, and as a recommendation for action the operation of the sensor device is generated with a battery of the preferential battery type as a supply battery.

With the sensor device, in addition to measuring data, the detection of which is the actual object of the sensor device, the invention therefore also provides for the detection and transmission of operating state data of the supply battery to an evaluation system. On the basis of the operating state data and an energy demand of the sensor device determined by the evaluation system, a recommendation for action is generated by the evaluation system for the optimized operation of the sensor device. The invention enables, during real operation of the sensor device, the operating state of the supply battery and the energy demand of the sensor device to be monitored, in order to derive an optimized operation of the sensor device therefrom. The invention takes into account that, as already cited above, the energy demand of the sensor device and operating parameters relevant to the supply battery, such as the course of the battery temperature, can only be predicted with difficulty and with significant uncertainty. The monitoring and evaluation of the energy demand of the sensor device and the operating state of the supply battery during real operation of the sensor device enables an optimized operation of the sensor device by adjusting the operation of the sensor device to the conditions occurring during real operation according to the generated recommendation for action.

In the evaluation system battery type data of various battery types is provided, wherein a preferential battery type is determined by the evaluation system on the basis of the operating state data of the supply battery, the energy demand of the sensor device and the battery type data, and as a recommendation for action the operation of the sensor device is generated with a battery of the preferential battery type as a supply battery. For instance, data sheet specifications of a manufacturer of the battery type and/or operating state data, detected in the past, of at least one battery of the battery type are provided here as battery type data of a battery type. Furthermore, a battery rated capacitance, a battery capacitance as a function of a battery temperature and/or of a battery discharge current, a failure rate, a battery internal resistance, a maximum battery discharge current, a battery rated voltage and/or geometric battery dimensions are provided here as battery type data of a battery type.

One embodiment of the invention provides that battery voltages and battery temperatures of the supply battery are detected as battery state data. The battery voltage and the battery temperature are the most important indicators of the operating state of the supply battery for the operation of the sensor device, since in particular an available residual capacitance of the supply battery depends on or can be derived from their course, and further variables which are relevant to the assessment of the operating state of the supply battery also depend on their course. For instance, a temporal development of a battery internal resistance of the supply battery can be determined from the battery voltages detected at different measuring time points and the associated battery discharge currents if the battery discharge currents are known or detected. Conclusions as to the aging development of the supply battery can advantageously be drawn from the temporal development of the battery internal resistance.

A further embodiment of the invention provides that battery discharge currents of the supply battery are detected as operating state data. This embodiment of the invention is then particularly advantageous, for instance to determine the temporal development of the battery internal resistance, if the battery discharge currents are not known otherwise or are not deducible.

A further embodiment of the invention provides that the evaluation system is used to determine and evaluate a frequency distribution of the battery temperature among temperature intervals and/or at least one distribution of values of one of the battery parameters, battery voltage, battery discharge current, battery internal resistance or battery power as a function of the battery temperature in order to generate the recommendation for action. This embodiment of the invention takes into account that the battery state of the supply battery essentially depends on the battery temperature. The battery temperature and the dependency of other battery parameters on the battery temperature are therefore particularly important indicators of the development of the battery state of the supply battery.

A further embodiment of the invention provides that the energy demand is determined from time slices, which are allotted to the operation of the sensor device in various modes of operation in each case, and powers which are required for the operation of the sensor device in each of the operating modes. This embodiment of the invention makes use of the fact that the sensor device in different operating modes generally requires different powers. The energy demand of the sensor device can therefore be determined from the time slices allotted to the different operating modes and the powers required for the operating modes in each case.

A further embodiment of the invention provides that a preferential design of the sensor device is determined by the evaluation system on the basis of the operating state data of the supply battery and the energy demand of the sensor device and as a recommendation for action the design of the sensor device is generated according to the preferential design. This embodiment of the invention enables the design of the sensor device to be adjusted to the operating conditions occurring during real operation of the sensor device.

The afore-cited embodiment of the invention enables a battery type of the supply battery to be adjusted to the operating conditions occurring during real operation of the sensor device. Here the sensor device is operated in a first operating phase with a first supply battery and in the first operating phase a preferential battery type is determined on the basis of the operating state data of the supply battery, the energy demand of the sensor device and the battery type data, said preferential battery type being adjusted to the energy demand. In other words, in the first operating phase the energy demand occurring during real operation of the sensor device and the operating conditions occurring during real operation of the sensor device and a preferential battery type adjusted to this energy demand and these operating conditions are determined. In a second operating phase, the first supply battery is replaced by a battery of the preferential battery type if the first supply battery is not a battery of the preferential battery type. As a result, the sensor device can be operated in the second operating phase with a supply battery which is optimally adjusted to the actual energy demand and the real operating conditions.

A further embodiment of the invention provides that a temporal distribution of operating modes of the sensor device is generated as a recommendation for action by the evaluation system. This embodiment of the invention enables the distribution of the operating modes of the sensor device to be adjusted to the operating conditions occurring during real operation of the sensor device.

A further embodiment of the invention provides that the evaluation system is realized in a cloud. This embodiment of the invention enables data stored in a cloud during the evaluation of the operating state data to be used so that this data can be easily updated and expanded. Moreover, the operating state data in the cloud can be easily made accessible to other applications and in particular used to enhance battery type data collected there.

A further embodiment of the invention provides that the operating state data can be transmitted with the communication unit by means of radio waves. This advantageously enables a wireless transmission of the operating state data.

An Inventive sensor device for carrying out the inventive method comprises a supply battery for supplying power to the sensor device, a sensor unit, with which the operating state data can be detected, and a communication unit, with which the operating state data can be transmitted to an evaluation system. A sensor device of this type enables the method according to the invention to be carried out with the afore-cited advantages.

An inventive drive system comprises an inventive sensor device for detecting machine measuring data relating to states of the drive system. In particular, the drive system can have an electric machine and the sensor unit of the sensor device can be designed to detect vibrations and/or temperatures in the electric machine. As an alternative or in addition, the drive system can have a power converter and the sensor unit of the sensor device can be designed to detect temperatures in the power converter.

BRIEF DESCRIPTION OF THE DRAWING

The above-described properties, features and advantages of this invention, as well as the manner in which these are realized, will become clearer and easier to understand in connection with the following description of exemplary embodiments which are explained in more detail with reference to the drawings, in which.

DETAILED DESCRIPTION OF PREFERRED EMBODIMENTS

Figure 1:
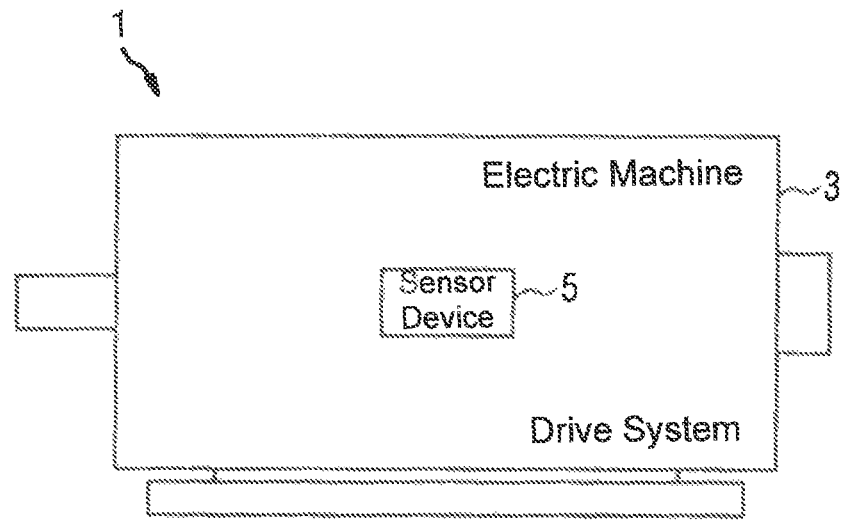
FIG. 1 shows a schematic representation of a drive system.

Parts which correspond to one another are provided with the same reference characters in the figures.

FIG. 1 shows a schematic representation of a drive system 1. The drive system 1 comprises a rotating electric machine 3 and a sensor device 5 for monitoring the electric machine 3. Machine measuring data relating to the states of the electric machine 3 is detected with the sensor device 5, for instance vibration measuring data relating to vibrations and/or temperature measuring data relating to temperatures of the electric machine 3.

Figure 2:
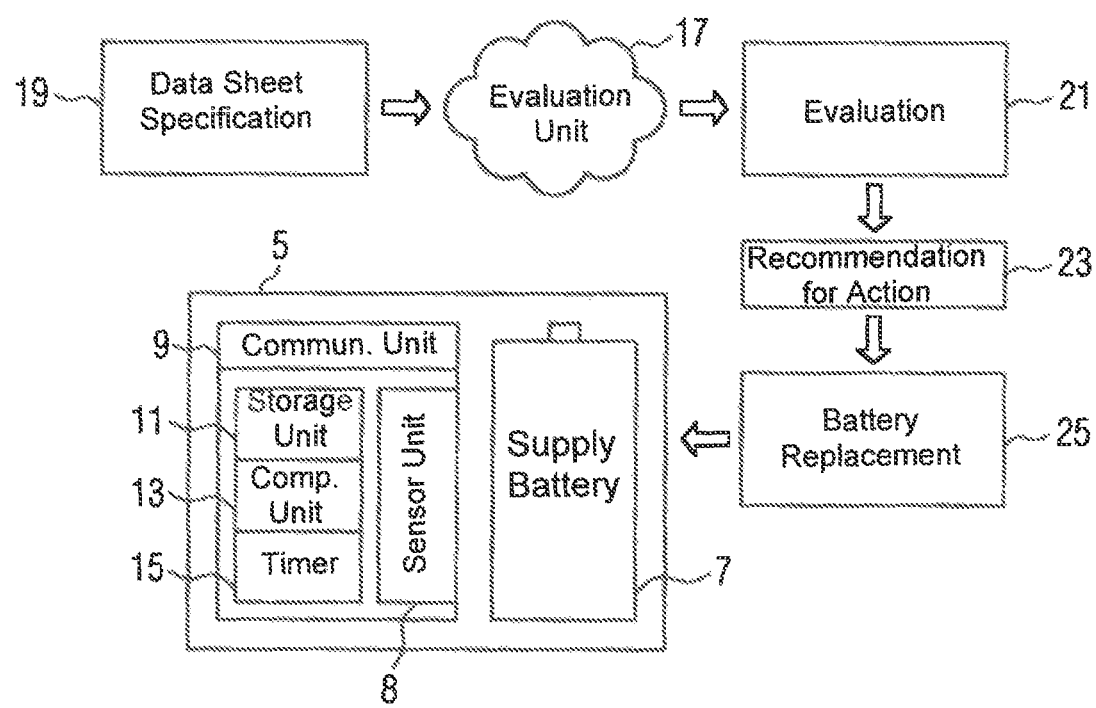
FIG. 2 shows a block diagram of an exemplary embodiment of a sensor device and a method for operating the sensor device.

FIG. 2 shows a block diagram of an exemplary embodiment of the sensor device 5 and a method for operating the sensor device 5.

The sensor device 5 comprises a supply battery 7 for supplying energy to the sensor device 5, a sensor unit 8, a communication unit 9, a storage unit 11, a computing unit 13 and a timer unit 15.

The machine measuring data and operating state data of the supply battery 7 is detected with the sensor unit 8. Suitable operating state data is described in more detail below.

Machine measuring data and operating state data detected by the sensor unit 8, possibly after preprocessing this data by means of the computing unit 13, is transmitted to an evaluation system 17 with the communication unit 9. The communication unit 9 has a transmit unit for radio waves, for instance, with which the data is transmitted wirelessly, for instance according to a Bluetooth or WLAN standard.

Programs for operating the sensor device 5 are stored in particular with the storage unit 11. Furthermore, machine measuring data and operating state data detected by the sensor unit 8 can be buffered using the storage unit 11.

The computing unit 13 is used to execute programs stored with the storage unit 11.

With the timer unit 15, a clock signal is in particular predetermined for the time controller of the sensor device 5.

The evaluation system 17 is realized in a cloud, for instance. Alternatively, the evaluation system 17 is realized on an edge device, for instance.

Battery type data from various battery types is provided in the evaluation system 17. For instance, data sheet specifications 19 of a manufacturer of the battery type and/or operating state data of at least one battery of the battery type which is detected in the past is provided as battery type data of a battery type.

An evaluation 21 of the operating state data and battery type data is performed by the evaluation system 17 as a function of an energy demand of the sensor device 5, in which a preferential battery type is determined, which is optimally adjusted to the operating state data and the energy demand. As a result of the evaluation 21, a recommendation for action 23 for operating the sensor device 5 with a battery of the preferential battery type is generated by the evaluation system 17 as a supply battery 7. If the supply battery 7 is not a battery of the preferential battery type, a battery replacement 25 is performed, in which the supply battery 7 is replaced by a battery of the preferential battery type.

The sensor device 5 is operated in various operating modes M1 to M4. The sequence and the durations of the operating modes M1 to M4 are predetermined, for instance by means of programming the sensor device 5, and are therefore known, but can be changed by a change in the specification. Furthermore, the power required by each of the operating modes M1 to M4 is known. The energy demand of the sensor device 5 is determined from the time slices, which are allocated to the different operating modes M1 to M4 in each case, and the powers, which are each required for the operation of the sensor device 5 in the operating modes M1 to M4 in each case.

Figure 3:
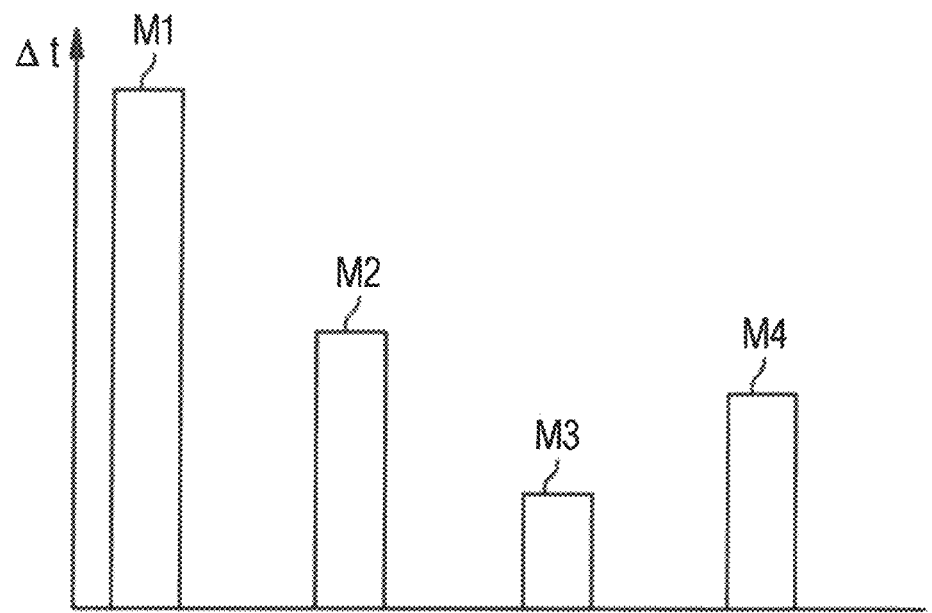
FIG. 3 shows a distribution of time slices of a sensor device which are allocated to different operating modes.

FIG. 3 shows, by way of example, time slices Δt which are allocated to four different operating modes M1 to M4 of the sensor device 5. For instance, a first operating mode M1 is a sleep mode, in which the sensor device 5 is predominantly inactive, a second operating mode M2 is a measuring operation for measuring vibration in the electric machine 3, a third operating mode M3 is a measuring operation for measuring temperatures of the electric machine 3, and a fourth operating mode M4 is a communication operation for transmitting data to the evaluation system 17.

Figure 4:
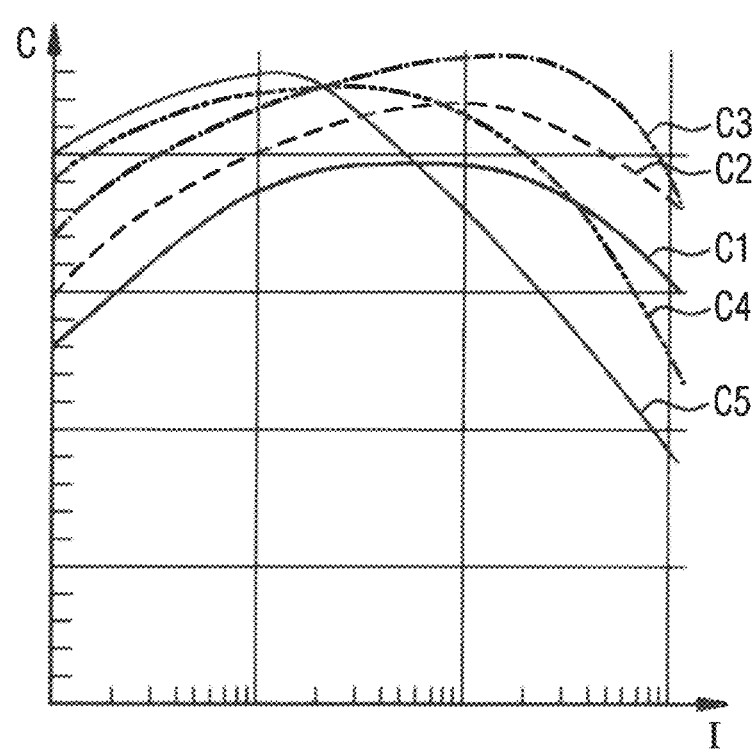
FIG. 4 shows battery type data of a battery type.

FIG. 4 shows battery type data of a battery type by way of example. Capacitance curves C1 to C5 of an available battery capacitance C of a battery of the battery type are shown as a function of a logarithmically shown battery discharge current I for different battery temperatures, which decrease from a first capacitance curve C1 to a fifth capacitance curve C5. As an alternative or in addition, a battery rated capacitance, a failure rate, a battery internal resistance, a maximum battery discharge current, a battery rated voltage and/or geometric battery dimensions can be provided as battery type data of a battery type, for instance.

Battery voltages U and battery temperatures T of the supply battery 7 are detected as operating state data at various measuring time instants $t_1$, $t_2$ using the sensor unit 8. In addition, provision can be made for battery discharge currents I of the supply battery 7 to be detected as operating state data with the sensor unit 8 if the battery discharge currents I are not known or cannot be determined differently.

Figure 5:
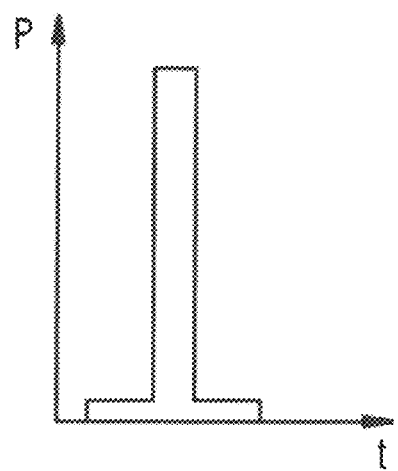
FIG. 5 shows temporal courses of a battery power and a battery voltage of a supply battery.
Figure 5:
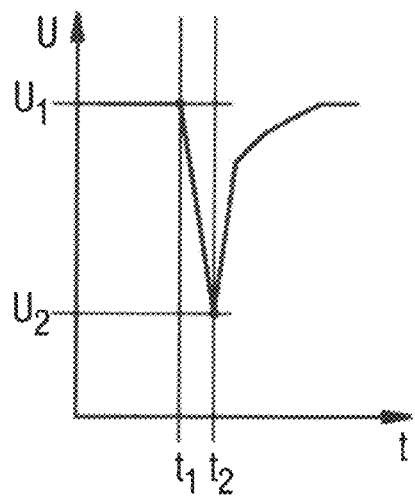

By way of example FIG. 5 shows curves of a battery power P and a battery voltage U of the supply battery 7 as a function of a time t in a radio pulse operation of the sensor device 5, in which in terms of pulses the battery power P only differs noticeably from zero. For instance the battery voltage U is measured at a first measuring time instant $t_1$ briefly before a power pulse and at a second measuring time instant $t_2$ briefly after the power pulse. An internal resistance R of the supply battery 7 according to $R=(U_1-U_2)/(I_1-I_2)$ is determined from the difference in the battery voltages $U_1=U(t_1)$ and $U_2=U(t_2)$ and a difference in the battery discharge currents $I_1=I(t_1)$ and $I_2=1(t_2)$ at these measuring time instants $t_1$, $t_2$.

The operating state data is evaluated with the evaluation 21 in particular with statistical methods.

Figure 6:
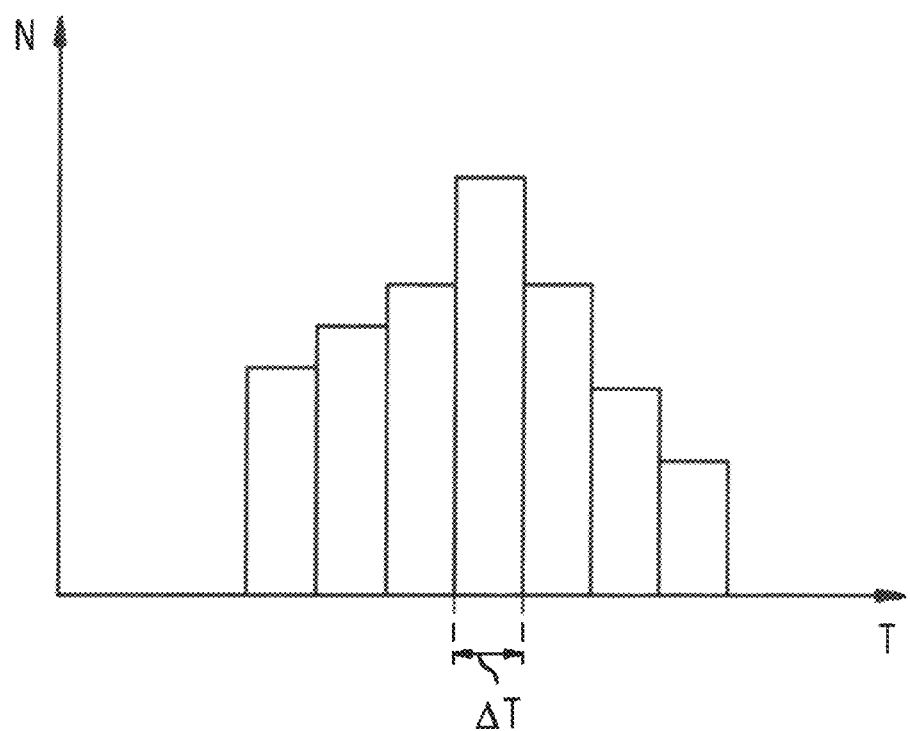
FIG. 6 shows a frequency distribution of battery temperatures of a supply battery.

FIG. 6 shows by way of example a statistical evaluation of detected battery temperatures T in the form of a frequency distribution of battery temperatures T, in which a frequency N of battery temperatures T is determined for different temperature intervals ΔT.

As an alternative or in addition, during the evaluation 21, at least one distribution of values, one of the battery parameters battery voltage U, battery discharge current I, battery internal resistance R or battery power P can be determined as a function of the battery temperature T and/or at least one temporal course of one of these battery parameters or the battery temperature T in order to generate the recommendation for action 23. Instead of a temporal evaluation, an evaluation can also take place as a function of frequencies which occur in a pulse operation of the sensor device 5.

Although the invention has been illustrated and described in detail based on preferred exemplary embodiments, the invention is not restricted by the examples given and other variations can be derived therefrom by a person skilled in the art without departing from the protective scope of the invention.

What is claimed is:

1. A method for operating a sensor device, comprising detecting by a sensor unit at different measuring time instants operating state data of a supply battery provided to supply power to the sensor device, the operating state data comprising a measured battery voltage and a measured battery temperature of the supply battery;
transmitting by a communication unit the operating state data to an evaluation system having stored therein battery type data of various battery types;
determining by the evaluation system an energy demand of the sensor device;
determining and evaluating by the evaluation system a frequency distribution of the battery temperature over temperature intervals and/or at least a distribution of values of a battery parameter selected from the group consisting of battery voltage, battery discharge current, battery internal resistance, and battery power as a function of the battery temperature in order to generate a recommendation for action;
determining by the evaluation system a preferential battery type as a function of the operating state data, the energy demand and the battery type data; and
generating the recommendation for action for optimized operation of the sensor device with a battery of the preferential battery type as a supply battery.

2. The method of claim 1, wherein the operating state data comprise a measured battery discharge current of the supply battery.

3. The method of claim 1, further comprising determining the energy demand from time intervals, during which the sensor device operates in different operating modes, and from power values required to operate the sensor device in the different operating modes.

4. The method of claim 1, further comprising:
determining by the evaluation system a preferential design of the sensor device based on the operating state data and the energy demand; and
generating as the recommendation for action a design of the sensor device in accordance with the preferential design.

5. The method of claim 1, wherein the battery type data comprise data sheet specifications from a manufacturer of a battery type or previously recorded operating state data of at least one battery of the battery type.

6. The method of claim 1, wherein the battery type data comprise data selected from a rated battery capacity, a battery capacity as a function of a battery temperature, a battery capacity as a function of a battery discharge current, a failure rate, an internal battery resistance, a maximum battery discharge current, a nominal battery voltage and geometric battery dimensions.

7. The method of claim 1, further comprising generating by the evaluation system as the recommendation for action a temporal distribution of operating modes of the sensor device.

8. The method of claim 1, wherein the evaluation system is implemented in a cloud.

9. The method of claim 1, wherein the operating state data are transmitted by the communication unit via radio waves.

10. A sensor device, comprising:
a supply battery;
a sensor unit configured to detect operating state data of the supply battery at different measuring time instants, with the operating state data comprising a measured battery voltage and a measured battery temperature of the supply battery; and
a communication unit configured to transmit the operating state data to an evaluation system having stored therein battery type data of various battery types, with the evaluation system configured to determine an energy demand of the sensor device;

to determine and evaluate a frequency distribution of the battery temperature over temperature intervals and/or at least a distribution of values of a batter parameter selected from the group consisting of battery voltage, battery discharge current, battery internal resistance, and batter power as a function of the battery temperature, and to determine a preferential battery type based on the operating state data, the energy demand, the frequency distribution or the distribution of values, and the battery type data, and to generate a recommendation for action for optimized operation of the sensor device with a battery of the preferential battery type as the supply battery.

11. The sensor device of claim 10, wherein the communication unit transmits the operating state data via radio waves.

12. A drive system, comprising a sensor device for detecting machine measuring data relating to a state of the drive system, said sensor device comprising a supply battery, a sensor unit configured to detect operating state data of the supply battery at different measuring time instants, with the operating state data comprising a measured battery voltage and a measured battery temperature of the supply battery, and a communication unit configured to transmit the operating state data to an evaluation system having stored therein battery type data of various battery types, with the evaluation system configured to determine an energy demand of the sensor device, to determine and evaluate a frequency distribution of the battery temperature over temperature intervals and/or at least a distribution of values of a battery parameter selected from the group consisting of battery voltage, battery discharge current, battery internal resistance, and batter power as a function of the battery temperature, and to determine a preferential battery type based on the operating state data, the energy demand, the frequency distribution or the distribution of values, and the battery type data, and to generate a recommendation for action for optimized operation of the sensor device with a battery of the preferential battery type as the supply battery.

13. The drive system of claim 12, further comprising an electric machine, said sensor unit configured detect machine measuring data relating to a state of the electric machine.

14. The drive system of claim 13, wherein the machine measuring data includes a vibration and/or temperature of the electric machine.

15. The method of claim 1, wherein the operating state data are evaluated with statistical methods.

16. The sensor device of claim 10, wherein the operating state data are evaluated with statistical methods.

17. The drive system of claim 12, wherein the operating state data are evaluated with statistical methods.

* * * * *

UNITED STATES PATENT AND TRADEMARK OFFICE
CERTIFICATE OF CORRECTION

PATENT NO. : 11,404,730 B2
APPLICATION NO. : 16/970885
DATED : August 2, 2022
INVENTOR(S) : Jürgen Zettner and Dirk Scheibner It is certified that error appears in the above-identified patent and that said Letters Patent is hereby corrected as shown below:

On the Title Page

Under (30) Foreign Application Priority Data:
Replace "EP 118157750" with --EP 18157750.3--.

In the Claims

In Column 9, Claim 10, Line 11:
Replace "batter" with --battery--.
In Column 10, Claim 12, Line 9:
Replace "batter" with --battery--.

Signed and Sealed this
Twentieth Day of September, 2022

Katherine Kelly Vidal
*Director of the United States Patent and Trademark Office*